US010647790B2

(12) United States Patent
Cai et al.

(10) Patent No.: US 10,647,790 B2
(45) Date of Patent: May 12, 2020

(54) PROCESS FOR GAS-PHASE POLYMERIZATION HAVING HIGH BED BULK DENSITY

(75) Inventors: Ping Cai, Lake Jackson, TX (US); Jan W. Van Egmond, Charleston, WV (US); Matthew J. Fedec, Lake Jackson, TX (US); Jeffrey D. Goad, Barboursville, WV (US); Robert C. Brady, III, Missouri City, TX (US); Linfeng Chen, Missouri City, TX (US)

(73) Assignee: W. R. Grace & Co.-Conn., Columbia, MD (US)

(*) Notice: Subject to any disclaimer, the term of this patent is extended or adjusted under 35 U.S.C. 154(b) by 1255 days.

(21) Appl. No.: 13/172,969

(22) Filed: Jun. 30, 2011

(65) Prior Publication Data

US 2013/0005923 A1 Jan. 3, 2013

(51) Int. Cl.
*C08F 10/06* (2006.01)
*C08F 110/06* (2006.01)
*C08F 210/06* (2006.01)

(52) U.S. Cl.
CPC ............ *C08F 10/06* (2013.01); *C08F 110/06* (2013.01); *C08F 210/06* (2013.01)

(58) Field of Classification Search
CPC ............. C08F 10/06; C08F 2/34; C08F 2/005
USPC ....................................................... 526/351
See application file for complete search history.

(56) References Cited

U.S. PATENT DOCUMENTS

| | | | |
|---|---|---|---|
| 3,639,377 A | 2/1972 | Trieschmann et al. | |
| 4,101,289 A | 7/1978 | Jezl et al. | |
| 4,543,399 A | 9/1985 | Jenkins, III et al. | |
| 4,588,790 A | 5/1986 | Jenkins, III et al. | |
| 4,933,149 A * | 6/1990 | Rhee ...................... | B01J 8/1827 |
| | | | 422/131 |
| 4,994,534 A | 2/1991 | Rhee et al. | |
| 5,352,749 A | 10/1994 | DeChellis et al. | |
| 5,436,304 A | 7/1995 | Griffin et al. | |
| 5,462,999 A | 10/1995 | Griffin et al. | |
| 6,350,054 B1 * | 2/2002 | Lee ........................... | B01F 7/04 |
| | | | 366/325.92 |
| 6,460,412 B1 | 10/2002 | Cai et al. | |
| 6,489,408 B2 | 12/2002 | Mawson et al. | |
| 2005/0137364 A1 | 6/2005 | Cai et al. | |
| 2005/0245698 A1 * | 11/2005 | Li ........................... | C08F 110/06 |
| | | | 526/125.3 |
| 2010/0317510 A1 | 12/2010 | Chen et al. | |
| 2011/0152424 A1 * | 6/2011 | Cai ........................ | C08F 10/06 |
| | | | 524/261 |
| 2011/0172377 A1 | 7/2011 | Cai et al. | |

FOREIGN PATENT DOCUMENTS

| | | |
|---|---|---|
| CN | 1281380 A | 1/2001 |
| CN | 1856514 A | 11/2006 |
| CN | 101241023 A | 8/2008 |
| CN | 101848946 A | 9/2010 |
| WO | 2009029487 A1 | 3/2009 |
| WO | WO 2009029486 A2 * 3/2009 | ............ B01J 8/1809 |

OTHER PUBLICATIONS

PCT/ US2012/042459, International Search Report and the Written Opinion of the International Searching Authority.
Cao, Yijia, Wei Liu, Jingdai Wang, and Yang Yongrong. "Malfunction diagnosis in horizontal stirred bed reactors based on attractor comparison analysis of acoustic emission signals." *CIESC Journal*. 60.3 (2009): 585-92. Print.
Wen, C.Y., and Y.H. Yu. "A Generalized Method for Predicting the Minimum Fluidization Velocity." *AIChE Journal*. 12.3 (1966): 610-12. Print.
Narsimhan, G., On a Generalized Expression for Prediction of Minimum Fluidization Velocity, National Chemical Laboratory, Poona, India, A.I.Ch.E. Journal, May 1965.
Wen, C.Y. and Yu, Y.H., Mechanics of Fluidization, American Institute of Chemical Engineers, Fluid particle technology, vol. 62, 1966.
Wen, C.Y. and Yu, Y.H., A Generalized Method for Predicting the Minimum Fluidization Velocity, West Virginia University, A.I.Ch.E Journal, May 1966.
Jena, H. M., et al. "Statistical analysis of the phase holdup characteristics of a gas-liquid-solid fluidized bed." The Canadian Journal of Chemical Engineering 87.1 (2009): 1-10.
Fan, Liang-Shih, "Gas-Liquid-Solid Fluidization Engineering." Copyright 1989 by Butterworth Publishers, pp. 3, 7, 21, 34, 434, 497-498, 694, and 707-711.

* cited by examiner

*Primary Examiner* — Peter D. Mulcahy
(74) *Attorney, Agent, or Firm* — Lerner, David, Littenberg, Krumholz & Mentlik, LLP

(57) ABSTRACT

The present invention relates to an improvement for gas-phase olefin polymerization process having relatively high bed bulk density. The improvement involves the use of mixed external electron donors when polymerizing propylene in a gas-phase reactor having a polymer bed with a bulk density greater than 128 kg/m$^3$, optionally with one or more comonomers, wherein the mixed external electron donor system comprises at least a first external electron donor and a second external electron donor, and wherein the first external electron donor is a carboxylate compound.

18 Claims, No Drawings

PROCESS FOR GAS-PHASE POLYMERIZATION HAVING HIGH BED BULK DENSITY

FIELD OF THE INVENTION

The present invention relates to an improvement for gas-phase olefin polymerization process having relatively high bed bulk density. The improvement involves the use of mixed external electron donors.

BACKGROUND AND SUMMARY OF THE INVENTION

The demand for high-performance polypropylene homopolymer and copolymer products has resulted in advanced manufacturing processes that have unique features. Gas-phase polymerization processes have been recognized as the most economical for the manufacture of polypropylene homopolymers, random copolymers, and impact copolymers. In such processes, the polymerization reactor contains a mixture of a solid bed of polymer particles and a gas phase that comprises propylene monomer, comonomer and hydrogen. Unlike slurry-phase polymerization processes, gas-phase processes do not require solid-liquid separation or product-catalyst separation. This feature makes the gas-phase processes easier to operate and more economical.

Operational issues may occur in gas-phase polymerization reactors if the process is not properly controlled. For example, polymer agglomerates or even polymer chunks may form and/or vessel surfaces may foul. These issues are typically caused by inadequate heat removal and/or strong electrostatic adhesion. When the heat of reaction is not removed rapidly, the polymer particle heats up to a surface temperature higher than the polymer softening temperature or even higher than the melting temperature of the polymer. Such operational problems can force the shutdown of the reactor for clean up, resulting in severe financial penalties.

In reactors with relatively-high bed bulk densities there usually are more active catalyst sites (sites where the polymerization reaction occurs) in the unit bed volume and more reaction heat generated in the unit bed volume. Moreover, the relatively-high bed bulk density is often associated with, or caused by, a relatively-low gas velocity, and hence a relatively-low heat removal capability by the gas phase. This further increases the possibility of particle agglomeration. The term "bed bulk density" refers to the weight of solids in the unit volume of the gas-solid bed in the reactor. This term is often equivalent to "fluidized bulk density (also known as "FBD")" when the gas-phase reactor is a fluidized bed reactor. For the purposes of this invention, when extending this concept to the non-fluidization gas-phase reactor in this invention, such as a mechanically stirred vertical gas-solid reactor with gas velocity smaller than the minimum fluidization velocity, both terminologies can still be used to mean the weight of solid per unit volume of the gas-solid system.

Previous attempts to solve the above-mentioned agglomeration problems include, for example, mechanical agitators added into both the vertical gas-phase reactors (e.g., U.S. Pat. No. 3,639,377) and horizontal gas-phase reactors (e.g., U.S. Pat. No. 4,101,289). However, the mechanical agitation does not always solve the agglomeration problem, and the agitator itself provides additional surface for fouling. The "chunk" formation in gas-phase reactors with agitator is well reported, such as CN 101241023, and CISEC Journal, Vol. 60, No. 3, pp. 585-592. In the latter document, it is stated that "in horizontal stirred-bed polypropylene reactor, chunking is a severe threat to the long-term stable operation and product quality of the reactor." The authors of that paper even further pointed to the polypropylene reactors of Innovene and Chisso processes, which are considered as reactors with relatively high bed bulk density, compared with other gas-phase fluidized-bed reactor operated under relatively high velocities, such as the reactors of The Dow Chemical Company's UNIPOL™ polypropylene process.

Therefore, the particle agglomeration in the gas-phase polymerization reactors with high bed bulk density could be a particular operational concern, and there is a need to develop a solution to the problem. The present invention provides an easy-to-apply, relatively low cost and low operational complexity, solution of this problem, without the need for any significant change of process equipment and operating conditions. The present invention is an improvement for gas-phase polymerization processes having a polymer bed with a bulk density greater than 128 kg/m$^3$. The improvement involves the use of a mixed external electron donor feed, wherein the mixed electron donor system comprises at least a first external electron donor and a second external electron donor, and wherein the first external electron donor is a carboxylate compound.

DETAILED DESCRIPTION OF THE INVENTION

All references to the Periodic Table of the Elements herein shall refer to the "Periodic Table of the Elements," published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

This invention involves the use of a catalyst composition comprising a pro-catalyst composition, a co-catalyst and a mixed electron donor (M-EED) which includes at least one activity limiting agent (ALA) and at least one selectivity control agent (SCA). The procatalyst composition of the present catalyst composition may be a Ziegler-Natta procatalyst composition. Any conventional Ziegler-Natta procatalyst may be used in the present catalyst composition as is commonly known in the art. In an embodiment, the Ziegler-Natta procatalyst composition contains titanium chloride, magnesium chloride, and optionally an internal electron donor.

The present invention relates to the use of special donor mixture which can sufficiently modify the kinetic profile of the polymerization and thus eliminate "hot" spots in the reactor associated with agglomeration or chunk formation. With the modified kinetic profile of the catalyst system, the catalyst activity would drop to a very low level or even zero before the temperature at the local catalyst active site reaches the softening temperature or the melting temperature of the polymer. In this way, it is very unlikely the surface temperature of the polymer particles can reach the softening temperature or the melting temperature of polymer, and the reactor can avoid the polymer particle agglomeration and the fouling at different locations in the production system (e.g., polymerization reactor, product discharge port, gas-recycle pipe, compressor, heat exchanger, etc.).

This invention also particularly benefits those reactor systems having a relatively high bed bulk density or relatively high fluidized bulk density (also known as "FBD"). Bed bulk density or FBD, as used herein, is the weight of solids in the unit volume of the gas-solid system. For purposes of this invention, when extending this concept to the non-fluidization gas-phase reactor in this invention, such as the mechanically stirred vertical gas-solid reactor with gas velocity smaller than the minimum fluidization velocity, both terminologies can still be used to mean the weight of solid per unit volume of the gas-solid system. Bed bulk density and FBD can be determined by different methods, such as pressure drop measurement, direct bed weight and bed height measurement (e.g., U.S. Pat. No. 6,460,412). The present invention is particularly applicable for reactor systems having a bed bulk density of 128 kg/m$^3$ or higher, or 160 kg/m$^3$ or higher, or even 192 kg/m$^3$ or higher.

This invention can especially benefit those reactor systems with the bed of relatively high solid holdup. A higher solid holdup typically results in a higher possibility of particle agglomeration. The term "solid holdup" means the volumetric fraction of the solid in a gas-solid system. The solid holdup can be determined in different ways. One of the commonly used methods is to measure weight and bed height via differential-pressure measurement (through taps on the reactor wall). Then the volume and holdup of the solid in the reactor can be estimated, with the information of particle density. In some embodiments, this invention is used with (but not limited to) reactor systems with the solid holdup larger than 0.17 (or 17%), preferably larger than 0.21 (or 21%) and most preferably larger than 0.25 (or 25%). As is known by those skilled in the art, the solid holdup will depend in part on the granular particle density, and so these typical values may be lower or higher for certain bed bulk density if the granular particles are at the extremes of possible densities.

This invention can be applied to any gas-phase polymerization reactor system including those operated under the condition of packed bed (fixed bed), homogeneous fluidization, bubbling fluidization, turbulent fluidization, "high density circulating fluidized bed", spouted bed, spout-fluid bed, dense-phase pneumatic convey, and packed (or fixed) moving bed (including the mass flow and funnel flow). The invention is also especially suitable for mechanically stirred fluidized and non-fluidized gas-phase polymerization reactor. The gas and solid can contact in any way including co-current, counter-current, solid batch, etc. The process of the present invention can optionally include pre-polymerization, but it is not mandatory.

Within a given reactor system, the values of bed bulk density and solid holdup can be changed within certain ranges by manipulating the reactor operating conditions. In an embodiment of the disclosure, the gas-phase reactor can have a bed volume greater than or equal to 35% of the reactor volume.

Similarly, this invention can particularly benefit those reactors with a relatively low gas velocity, because a lower gas velocity typically results in a higher possibility of particle agglomeration. In some embodiments, this invention is used with (but not limited to) a reactor system in which the superficial gas velocity is less than 10 times of the minimum fluidization velocity, and preferably less than 8 times of the minimum fluidization velocity and most preferably less than 5 times of the minimum fluidization velocity. It is contemplated that the present invention also has particular applicability where the superficial velocity is near or even below the minimum fluidization velocity. The minimum fluidization velocity can be measured in the way described in any fluidization text book. However, it is practically not very convenient to measure under the reaction conditions. So it can be approximated using well-known equations such as the one published by Wen and Yu in 1966 (AIChE J., Vol. 12, p. 610).

In another embodiment, the processes disclosed herein may be operated in a condensing mode, similar to those disclosed in U.S. Pat. Nos. 4,543,399, 4,588,790, 4,994,534, 5,352,749, 5,462,999, and 6,489,408, and U.S. Patent Application Publication No. 20050137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

More specifically, this invention involves the use of a catalyst composition comprising: a pro-catalyst composition; a co-catalyst; and a mixed external electron donor (M-EED) of two or more different components which includes at least one activity limiting agent (ALA) and at least one selectivity control agent (SCA). As used herein, an "external electron donor" is a composition added independent of procatalyst formation that modifies the catalyst performance. As used herein, an "activity limiting agent" is a composition that decreases catalyst activity as the catalyst temperature rises above a threshold temperature (e.g., temperature greater than about 80° C., 85° C., or 90° C.). A "selectivity control agent" is a component that improves polymer tacticity. It should be understood that the above definitions are not mutually exclusive and that a single compound may be classified, for example, as both an activity limiting agent and a selectivity control agent.

The mixed external electron donor compound for use in the present invention preferably includes at least one carboxylate compound. The carboxylate compound can be either an ALA and/or a SCA component.

The selectivity control agent(s) (SCA) may be selected from one or more of the following: an alkoxysilane, an amine, an ether, a carboxylate, a ketone, an amide, a carbamate, a phosphine, a phosphate, a phosphite, a sulfonate, a sulfone, and/or a sulfoxide.

In an embodiment, the external electron donor includes an alkoxysilane. The alkoxysilane has the general formula: $SiR_m(OR')_{4-m}$(I) where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ arylalkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, isobutylisopropyldimethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, diethylaminotriethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition is dicyclopentyldimethoxysilane (DCPDMS), methylcyclohexyldimethoxysilane (MChDMS), or n-propyltrimethoxysilane (NPTMS), and any combination of thereof.

In an embodiment, the selectivity control agent component can be a mixture of 2 or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane.

In an embodiment, the mixed external electron donor may include a benzoate, a succinate, and/or a diol ester. In an embodiment, the mixed external electron donor includes 2,2,6,6-tetramethylpiperidine as an SCA. In another embodiment, the mixed external electron donor includes a diether as both an SCA and an ALA.

The mixed external electron donor system also includes an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate, ethyl p-methoxybenzoate, methyl p-ethoxybenzoate, ethyl p-ethoxybenzoate, ethyl p-isopropoxybenzoate, ethyl acrylate, methyl methacrylate, ethyl acetate, ethyl p-chlorobenzoate, hexyl p-aminobenzoate, isopropyl naphthenate, n-amyl toluate, ethyl cyclohexanoate and propyl pivalate.

Nonlimiting examples of suitable polycarboxylic acid esters include dimethyl phthalate, diethyl phthalate, di-n-propyl phthalate, diisopropyl phthalate, di-n-butyl phthalate, diisobutyl phthalate, di-tert-butyl phthalate, diisoamyl phthalate, di-tert-amyl phthalate, dineopentyl phthalate, di-2-ethylhexyl phthalate, di-2-ethyldecyl phthalate, diethyl terephthalate, dioctyl terephthalate, and bis[4-(vinyloxy)butyl]terephthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ alkyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment, the activity limiting agent includes a diether. The diether can be a 1,3-diether compound represented by the following structure (VI):

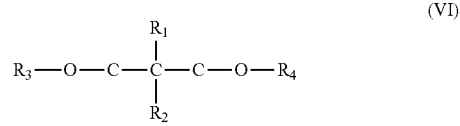

wherein $R_1$ to $R_4$ are independently of one another, an alkyl, aryl or aralkyl group having up to 20 carbon atoms, which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (VII):

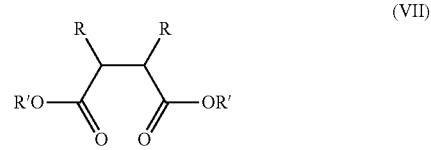

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

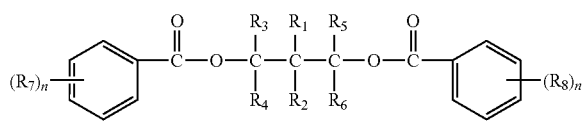

(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

The individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate, diisopropyldimethoxysilane and isopropyl myristate, dicyclopentyldimethoxysilane and poly(ethylene glycol) laurate, dicyclopentyldimethoxysilane and isopropyl myristate and poly(ethylene glycol) dioleate, methylcyclohexyldimethoxysilane and isopropyl myristate, n-propyltrimethoxysilane and isopropyl myristate, dimethyldimethoxysilane and methylcyclohexyldimethoxysilane and isopropyl myristate, dicyclopentyldimethoxysilane and n-propyltriethoxysilane and isopropyl myristate, diisopropyldimethoxysilane and n-propyltriethoxysilane and isopropyl myristate, and dicyclopentyldimethoxysilane and tetraethoxysilane and isopropyl myristate, dicyclopentyldimethoxysilane and diisopropyldimethoxysilane and n-propyltriethoxysilane and isopropyl myristate, and combinations thereof.

The M-EED, whether added separately or pre-mixed, may be added at any point in the reactor, although the ALA should be present in the areas considered to be a greatest risk for agglomeration, such as the areas with highest solid holdup, highest FBD and/or lowest gas velocity.

The present catalyst composition includes a cocatalyst. The cocatalyst for use with the foregoing Ziegler-Natta procatalyst composition may be an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a C1-4 trialkylaluminum compound, such as triethylaluminum (TEA). The catalyst composition includes a mole ratio of Al to (SCA(s)+ALA(s)) of 0.5-25:1, or 1.0-20:1, or 1.5-15:1, or less than about 6.0, or less than about 5, or less than 4.5. In an embodiment, the Al: (SCA(s)+ALA(s)) mole ratio is 0.5-4.0:1. The total-SCA to ALA mole ratio is 0.01-20:1, 0.10-5.00:1, 0.43-2.33:1, or 0.54-1.85:1, or 0.67-1.5:1.

EXAMPLES

In order to demonstrate the effectiveness of the present invention, the following polymerization reactions can be carried out:

| Example | Comparative 1 | Comparative 2 | 3 | 4 |
| --- | --- | --- | --- | --- |
| Catalyst | Z-N (see Example 1 of U.S. Pat. No. 6,825,146) | | | |
| External Electron Donor | DCPDMS (Dicyclopentyldimethoxysilane) (also called "D-Donor") | | 95% DBS (di-n-butyl sebacate) + 5% "C Donor" (methylcyclohexyldimethoxysilane) | |
| Product | Homo Polypropylene | Propylene-Ethylene Random Copolymer | Homo Polypropylene | Propylene-Ethylene Random Copolymer |
| Ethylene wt % in product | 0 | 3% | 0 | 3% |
| Reactor | Vertical Gas-Phase Reactor with mechanical agitation (similar to that of Example 2 in U.S. Pat. No. 3,639,377) | Horizontal Fluidized-Bed Reactor with mechanical agitation (similar to that of Example 2 in U.S. Pat. No. 6,350,054) | Vertical Gas-Phase Reactor with mechanical agitation (similar to that of Example 2 in U.S. Pat. No. 3,639,377) | Horizontal Fluidized-Bed Reactor with mechanical agitation (similar to that of Example 2 in U.S. Pat. No. 6,350,054) |
| Agitator Rotation Speed (RPM) | 26 | 12 | 26 | 12 |
| Reactor Flow Pattern | Non-fluidized | Dense-phase fluidization | Non-fluidized | Dense-phase fluidization |
| Vol % of bulk polymer bed in reactor | 80% | 50% | 80% | 50% |
| Average Particle Size (mm) | 1.7 | 1.0 | 1.7 | 1.0 |
| Particle Settled Bulk Density (kg/m$^3$) | 415 | 432 | 415 | 430 |
| Average Reactor Total Pressure (Pa-gauge) | $3.20 \times 10^6$ | $2.0 \times 10^6$ | $3.20 \times 10^6$ | $2.0 \times 10^6$ |

-continued

| Example | Comparative 1 | Comparative 2 | 3 | 4 |
| --- | --- | --- | --- | --- |
| Controlled Reactor Temperature (° C.) | 72 | 65 | 72 | 65 |
| Bed Bulk Density (FBD) (kg/m$^3$) | 382 | 256 | 381 | 258 |

Comparative Examples 1 & 2

After a steady operation is reached, there is a mechanical problem with the agitator, and the agitator stops moving. Although the kill gas is introduced into the reactor quickly to terminate the polymerization reaction, polymer agglomeration still forms. After the agitator problem is fixed, the reactor cannot return to the normal operation because the agitator is blocked by large pieces of polymer agglomerates (so-called "chunks"). Product discharge lines are also blocked by the "chunks." The reactor has to be shut down for cleaning, before going back to the normal operation.

Examples 3 & 4

Everything is the same as the comparative examples, except the external electron donor is replaced by the mixed donor of this invention (see the above table for detailed donor composition). The same agitator problems as that in the Comparative Examples A & B are encountered. Catalyst and co-catalyst supply is shut off promptly, and the kill gas is introduced into the reactor, and the reactor is "idled." After the agitator problem is fixed, the reactor is back to operation without problem. There is no polymer agglomerates blocking the movement of agitators.

We claim:

1. A polymerization process for making polypropylene or propylene copolymer containing $C_2$ to $C_8$ comonomers in a gas phase reactor, the process comprising:
   polymerizing propylene, optionally with one or more comonomers, in a single flow-pattern gas-phase reactor having a polymer bed with a bed bulk density greater than 128 kg/m$^3$, in the presence of a catalyst composition comprising a procatalyst composition and a cocatalyst composition, and a mixed electron donor system, wherein:
   a) the mixed electron donor system includes at least a first external electron donor and at least a second external electron donor, the mixed electron donor system comprising at least one selectivity control agent and at least one activity limiting agent, and wherein one of the external electron donors is a carboxylate compound; and
   b) the gas-phase reactor having a superficial gas velocity that is less than 10 times the minimum fluidization velocity; and wherein the gas-phase reactor has a solid holdup larger than 0.17.

2. The process of claim 1 wherein the gas-phase reactor is a mechanically stirred vertical gas-phase reactor.

3. The process of claim 2 wherein the gas-phase reactor discharges the product through a dip tube or eductor tube.

4. The process of claim 1 wherein the gas-phase reactor has a bed volume greater than or equal to 35% of the reactor volume.

5. The process of claim 1 wherein the gas-phase reactor is a horizontal gas-phase reactor that is mechanically stirred.

6. The process of claim 1 wherein the activity limiting agent is selected from the group consisting of a carboxylic acid ester, a diether, a poly(alkene glycol), a diol ester, and combinations thereof.

7. The process of claim 1 wherein the activity limiting agent is selected from the group consisting of a laurate, a myristate, a palmitate, a stearate, and an oleate.

8. The process of claim 1 wherein the selectivity control agent is selected from the group consisting of an alkoxysilane, an amine, an ether, a carboxylate, a ketone, an amide, a carbamate, a phosphine, a phosphate, a phosphite, a sulfonate, a sulfone, and a sulfoxide, wherein the alkoxysilane has the general formula $SiR_m(OR')_{4-m}$, wherein each R is selected from the group consisting of $C_3$-$C_{12}$ cycloalkyl, $C_3$-$C_{12}$ branched alkyl, or $C_3$-$C_{12}$ cyclic or acyclic amino group, R' is $C_{1-4}$ alkyl, and m is 0, 1, or 2.

9. The process of claim 1 wherein the selectivity control agent is selected from $SiR_m(OR')_{4-m}$, wherein R is $C_3$-$C_{12}$ cycloalkyl, $C_3$-$C_{12}$ branched alkyl, or $C_3$-$C_{12}$ cyclic or acyclic amino group, R' is $C_{1-4}$ alkyl, and m is 0,1, or 2.

10. The process of claim 1 wherein the bed bulk density is greater than 160 kg/m$^3$.

11. The process of claim 1 wherein the bed bulk density is greater than 192 kg/m$^3$.

12. The process of claim 1 wherein the bed bulk density is between 128 kg/m$^3$ to 160 kg/m$^3$.

13. The process of claim 1 wherein the bed bulk density is between 128 kg/m$^3$ to 192 kg/m$^3$.

14. The process of claim 1 wherein the gas-phase reactor has a solid holdup larger than 0.21.

15. The process of claim 1 wherein the gas-phase reactor has a solid holdup larger than 0.25.

16. A polymerization process for making polypropylene or propylene copolymer containing $C_2$ to $C_8$ comonomers in a gas phase reactor, the process comprising:
   polymerizing propylene, optionally with one or more comonomers, in a single flow-pattern gas-phase reactor having a polymer bed with a bed bulk density greater than 128 kg/m$^3$, in the presence of a catalyst composition comprising a procatalyst composition and a cocatalyst composition, and a mixed electron donor system, wherein:
   a) the mixed electron donor system includes at least a first external electron donor and at least a second external electron donor, the mixed electron donor system comprising at least one selectivity control agent and at least one activity limiting agent, and wherein one of the external electron donors is a carboxylate compound; and
   b) the gas-phase reactor having a superficial gas velocity that is less than 10 times the minimum fluidization velocity; and wherein the gas-phase reactor has a solid holdup larger than 0.21 and a bed volume greater than or equal to 35% of the reactor volume.

17. The process of claim 16 wherein the bed bulk density is between 128 kg/m$^3$ to 192 kg/m$^3$.

18. The process of claim 16 wherein the gas-phase reactor has a solid holdup larger than 0.25.

* * * * *